United States Patent Office.

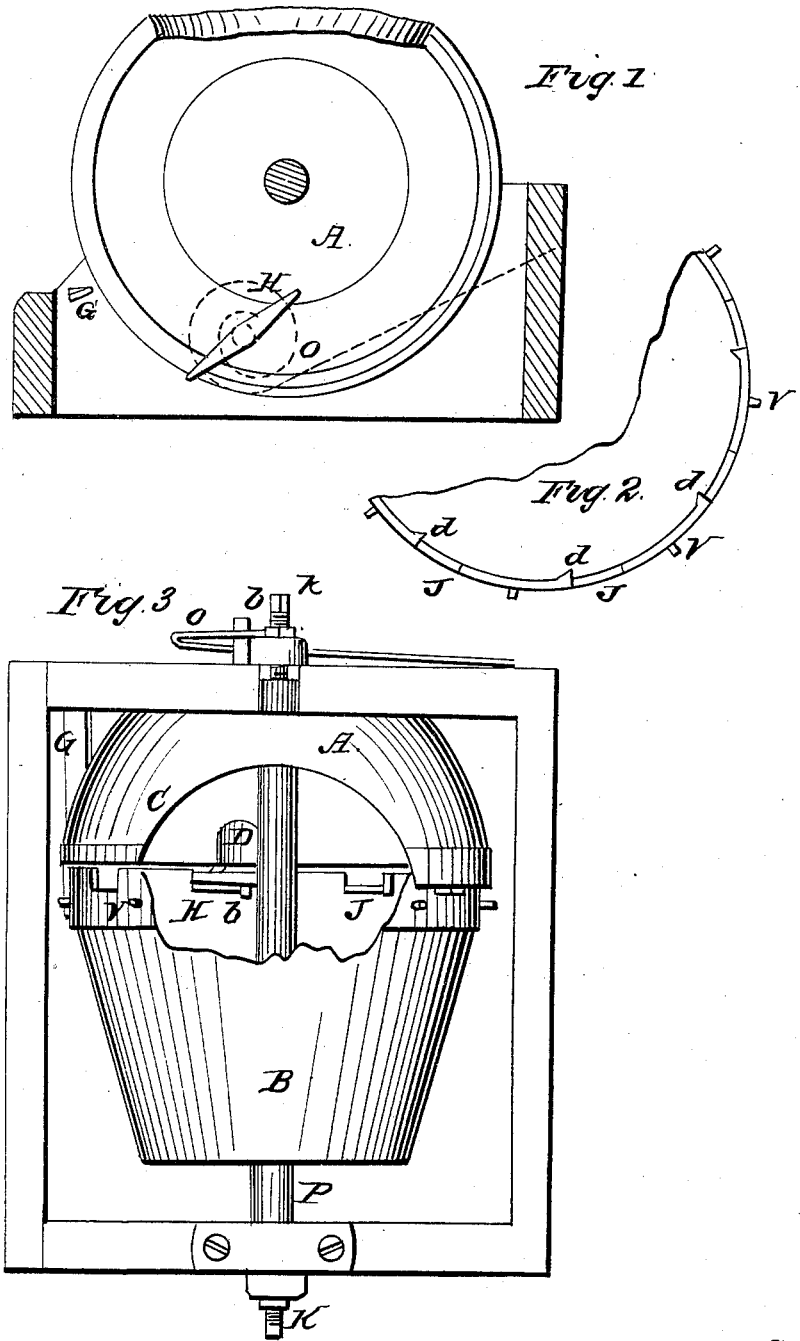

GILBERT JESSUP, OF SHORTSVILLE, NEW YORK.

Letters Patent No. 81,906, dated September 8, 1868; antedated August 27, 1868.

IMPROVEMENT IN COTTON-SEED PLANTER.

The Schedule referred to in these Letters Patent and making part of the same.

TO ALL WHOM IT MAY CONCERN:

Be it known that I, GILBERT JESSUP, of Shortsville, in the State of New York, have invented a new and useful Cotton-Seed Planter; and I do hereby declare that the following is a full, clear, and exact description thereof, reference being had to the accompanying drawing, making part of this specification, in which—

Figure 1 is a transverse section, showing the stationary end of my cotton-seed planter and the rock-shaft, with an arm attached to distribute the seed, also the spring operating the shaft, by red lines.

Figure 2 is a section taking off the end of the revolving cylinder, showing the slots and the projections on the edge of the slots.

Figure 3 is a top view, with a part of the revolving end broken away to show the position of the rock-shaft and arm.

Like letters indicate corresponding parts.

The nature of this invention consists in constructing a cotton-seed planter by joining two hollow cylinders together on a shaft, one having its edge slotted for the seed to pass through, the other having a rock-shaft with an arm attached, to force the seed through the slots; also, in providing a means by which the cylinders may be moved to and from each other to regulate the discharge of the seed.

To enable others skilled in the art to make and use my invention, I will proceed to describe its construction and operation.

I make my cotton-seed planter by joining two hollow cylinders, A and B, together on a shaft, P, shown in fig. 3. The cylinder A is fastened to the frame carrying the machine, so that it will be stationary. A hole is formed in the top for putting in the seed shown at C. On the inside, and at the bottom of the cylinder A, I cast a longitudinal projection, D, through which I make a hole for a rock-shaft, shown at $b$, on the out and insides. The cylinder B is fastened to the shaft P, and has slot J formed in its edge, through which the seed passes. On the inside of the cylinder, and on the edge of each slot, a slight projection is formed, shown at $d$, in fig. 2. I also put a pin, $v$, between each slot. On the inner end of the rock-shaft $b$, I put an arm, H, and on the outer end I put a spring, $o$, shown by red lines in fig. 1. This spring is fastened at one end to the frame carrying the planter, and the other to the rock-shaft.

To the frame carrying the planter, I also fasten a spring, G, which reaches to the pins $v$ in the part B, for the purpose of taking off the seed as it is pressed out. The shaft P is suspended between two set-screws, K, and also in proper journal-boxes.

The object of this machine is to plant cotton-seed in any required quantity, and at the same time to keep the seed from packing, so that it will come readily out of the machine.

The operation is such that when the machine is put on to wheels to carry it, the cylinder B being fast to the shaft P, it revolves with the shaft P, which receives motion from the driving-wheels by suitable connections, and keeps the seed agitated, and the arm H on the rock-shaft, passing from one slot to the other, is forced into the slot by means of the spring $o$, and presses the seed through or out of the machine.

The projection on the inside edge of the slot being sharp at the upper edge, cleans the seed from the arm as it is drawn into the machine.

The mode of altering the feed is by enlarging the size of the slots J, which is done by moving the shaft endways by the set-screws K. The moving in one direction separates the two cylinders and opens the slots. When it is required to lessen the feed, the cylinders are forced together by the set-screws K, operating on the shaft P.

The spring G is intended to cut off the seed as it is pressed out by the arm H. The spring being drawn up by the pin $v$ as the cylinder revolves, when it slips from the pin it throws the seed off by a concussive motion.

This machine may be made in one cylinder, with a flat head, but I prefer this construction; and in place of the slots being in the edge, holes may be made in the cylinder B and the arm H, to extend over to them, but I prefer having them in the edge.

What I claim, and wish to secure by Letters Patent, is—

1. The construction and arrangement of the revolving cylinder B with its slots J, shaft P in combination with the stationary cylinder A or its equivalent, for the purposes herein described.

2. The rock-shaft b, arm H, and spring o, in combination with the revolving cylinder B, all acting conjointly, in the manner and for the purposes shown and described.

3. The spring G or its equivalent, in combination with the pins v, for the purposes set forth.

4. The longitudinal adjustment of the shaft P and cylinder B, in combination with the stationary cylinder A or its equivalent, for the purposes of regulating the quantity of seed being distributed.

GILBERT JESSUP.

Witnesses:
JAS. LORENZO GAGE,
GEO. A. PEACOCK.